United States Patent [19]

Wilkomirsky et al.

[11] 4,415,540
[45] * Nov. 15, 1983

[54] RECOVERY OF NON-FERROUS METALS BY THERMAL TREATMENT OF SOLUTIONS CONTAINING NON-FERROUS AND IRON SULPHATES

[75] Inventors: Igor A. E. Wilkomirsky; Roy S. Boorman; Robert S. Salter, all of Fredericton, Canada

[73] Assignee: Provincial Holdings Ltd., Fredericton, Canada

[*] Notice: The portion of the term of this patent subsequent to Mar. 2, 1999 has been disclaimed.

[21] Appl. No.: 346,837

[22] Filed: Feb. 8, 1982

Related U.S. Application Data

[63] Continuation of Ser. No. 189,249, Sep. 22, 1980, Pat. No. 4,317,803, which is a continuation of Ser. No. 940,937, Nov. 11, 1978, Pat. No. 4,224,122.

[30] Foreign Application Priority Data

May 5, 1978 [CA] Canada .................................. 302719

[51] Int. Cl.$^3$ .............................. C01G 9/06
[52] U.S. Cl. ........................ 423/99; 423/27; 423/41; 423/45; 423/89; 423/98; 423/109; 423/150; 423/DIG. 2; 423/DIG. 16
[58] Field of Search .............. 423/98, 99, 109, 148, 423/150, DIG. 2, DIG. 16

[56] References Cited

U.S. PATENT DOCUMENTS

| | | | |
|---|---|---|---|
| 1,634,100 | 6/1927 | Gepp et al. | 423/99 |
| 2,155,119 | 4/1939 | Elmer | 423/DIG. 2 |
| 3,053,626 | 9/1962 | Patterson | 423/DIG. 2 |
| 3,181,944 | 5/1965 | Brook et al. | 423/99 |
| 3,230,071 | 1/1966 | Marvin | 423/99 |
| 3,676,107 | 2/1972 | Barnard et al. | 423/DIG. 2 |
| 3,745,207 | 7/1973 | Hansen | 423/DIG. 2 |
| 4,071,612 | 1/1978 | Weyer et al. | 423/DIG. 16 |

*Primary Examiner*—Herbert T. Carter
*Attorney, Agent, or Firm*—Ladas & Parry

[57] ABSTRACT

The specification discloses a method for recovering non-ferrous metals such as zinc or copper iron from their concentrates, ores or any other metal containing materials into a solution containing these non-ferrous metals as sulphates and a minimal amount of dissolved iron. The resultant solution is suited without or with minimum pre-purification treatment for conventional electrowinning processes to recover such non-ferrous metals with less difficulties than the previous methods involving complex iron-removal processing. There is disclosed a method for recovering at least one non-ferrous metal soluble in sulphuric acid from a strong sulphuric acid solution containing said metal and iron as sulphates, said method comprising the following consecutive steps:

subjecting said solution in a sub-divided form to thermal decomposition in a fluidized bed reactor at a temperature of from 600° to 750° C. with 20–150% excess air for an average retention time of 1–12 hours to obtain calcine containing ferric oxide and the sulphate of said non-ferrous metal;

leaching said non-ferrous metal sulphate out from said calcine with water or dilute sulphuric acid solutions;

separating said leach solution containing said non-ferrous metal sulphate from the residue; and recovering said non-ferrous metal from said leach solution, via electrolysis or any other method.

5 Claims, 13 Drawing Figures

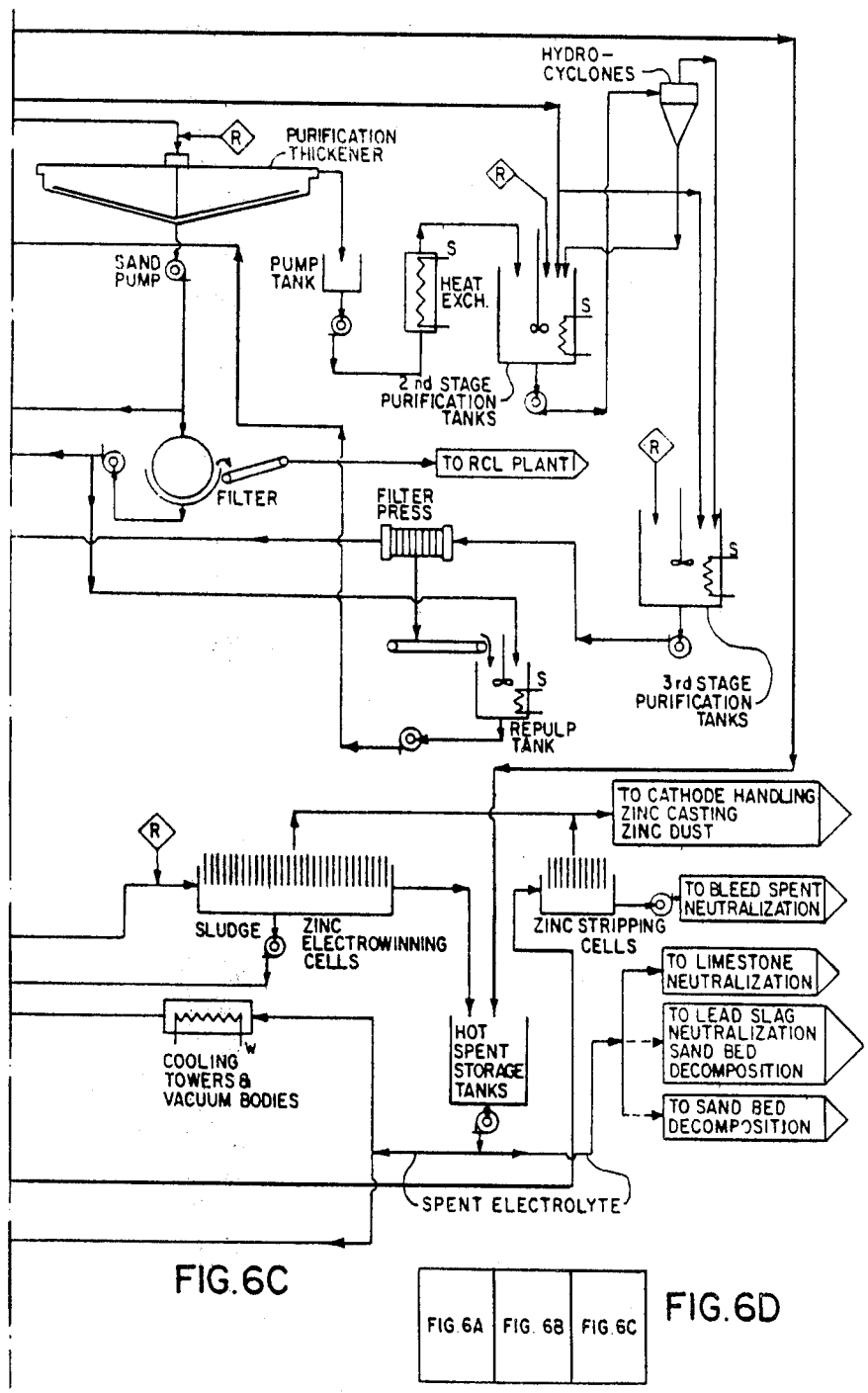

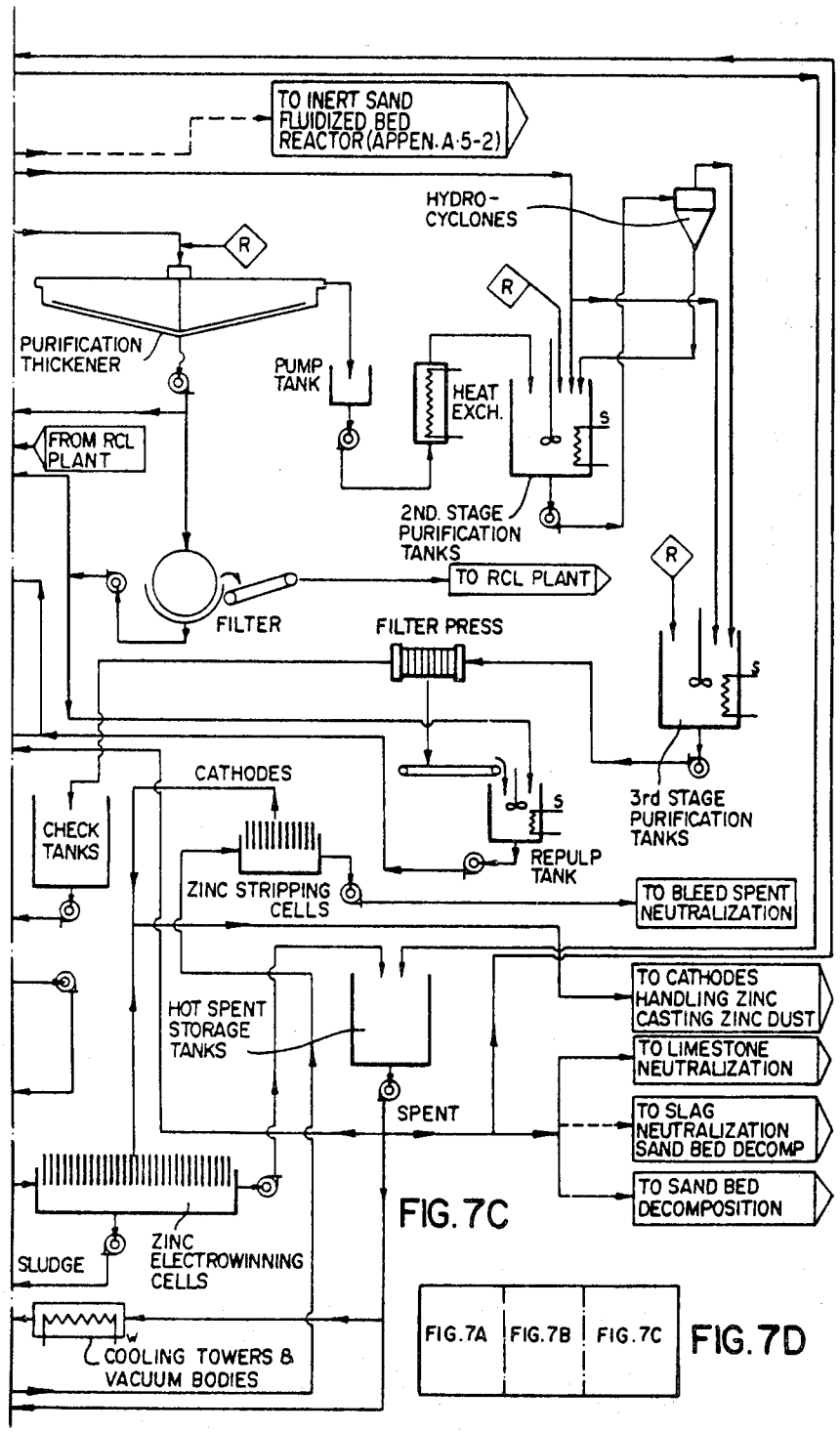

RECOVERY OF NON-FERROUS METALS BY THERMAL TREATMENT OF SOLUTIONS CONTAINING NON-FERROUS AND IRON SULPHATES

This is a continuation, of application Ser. No. 189,249 filed Sept. 22, 1980, now U.S. Pat. No. 4,317,830 which is continuation of Ser. No. 940,937 filed Nov. 11, 1978 now U.S. Pat. No. 4,224,122.

This invention relates to a method to recover non-ferrous metals such as zinc or copper from their concentrates, ores or any other metal containing materials into a solution containing these non-ferrous metals as sulphates and a minimal amount of dissolved iron. The resultant solution is suited without or with minimum pre-purification treatment for conventional electrowinning processes to recover such non-ferrous metals with less difficulties than the previous methods involving complex iron-removal processing. More particularly, this invention relates to a method for recovering non-ferrous metals such as zinc, from a strong sulphuric acid solution which contains said metals and iron as sulphates with less difficulties than the previous methods involving complex iron-removal processing.

During the roasting of zinc mill products either by sulphation or dead roasting, a quantity of zinc, generally representing up to 40% by weight of the total zinc in a feed, forms as the refractory compound ferrite ($ZnFe_2O_4$) which remains insoluble in the standard dilute acid leach ("neutral leach") used in the zinc industry. Although zinc ferrite can be leached in strong sulphuric acid solutions, the resultant iron also brought into solution by said strong acid treatment must then be removed in a conventional zinc plant practice prior to zinc electrolysis.

Several technologies have evolved for the removal of iron from solutions resulting from the strong acid leaching of ferrite residues. The more common of these in commercial usage include the jarosite process (Australian Pat. No. 401,774, Mar. 31, 1965; U.S. Pat. No. 3,493,365, Feb. 3, 1970; Spanish Pat. No. 304,601, Oct. 12, 1964; U.S. Pat. No. 3,434,798, Mar. 25, 1969; Norwegian Pat. No. 108,047, Apr. 30, 1965; U.S. Pat. No. 3,434,947, Mar. 25, 1969); the goethite process (Belgian Pat. No. 724,214, Nov. 20, 1968; U.S. Pat. No. 3,652,264, Mar. 28, 1971); and the hematite process (Australian Pat. No. 247,274, Dec. 5, 1960; U.S. Pat. No. 3,143,486, Aug. 4, 1964; Australian Pat. No. 255,428, Jan. 11, 1961; U.S. Pat. No. 3,193,382, July 6, 1965).

The jarosite process employs the addition of sodium, potassium or ammonia compounds to effect the precipitation of crystalline iron jarosites, which can be settled, filtered, washed and finally discarded more readily than can ferric hydroxide. The goethite process is somewhat similar to the jarosite process but is more energy-consuming and is somewhat dependent on the availability of low-cost steam. In the hematite process, iron is precipitated from solution, at 200° C. under pressure, as $Fe_2O_3$.

Although the jarosite, goethite and hematite processes have been effective in increasing zinc recoveries in the electrolytic process from the range 85-93% by weight to 96-98% by weight, the technologies are complex and energy-intensive. In the case of the more commonly employed jarosite process, the recovery of zinc from ferrite by a strong acid leach of the dilute acid leach residue rarely exceeds 70%. This represents a loss of 2-4% of the total zinc in the roaster feed. Also, the disposal of the voluminous jarosite precipitates is now being recognized as an environmental problem.

Apart from what is now conventional practice, that is, chemical dissolution of ferrite and subsequent iron handling, attempts have also been made to resulphate ferrite residues in a fluidized bed reactor (Steinveit, G. 1970, AIME World Symposium on Mining and Metallurgy of lead and zinc, vol. 11, p. 229; Alain S. Gill and Ralph W. Pickering, Can. Pat. No. 566.126, Nov. 18, 1958; Tanner, H. and Nyholm, E., Can. Pat. No. 977,555, Nov. 11, 1975; Moriyama, E., Ito, T., and Yamamoto, Y., Jap. Pat. Apln. Pub. No. 20881/68, Sept. 9, 1968, (Jap. Pat. No. 537551) and B. M. Hausen, Canadian Pat. No. 851,656, Sept. 15, 1970. The reaction rates for the resulphation of ferrite however are sluggish. This, plus other operational difficulties, results in a comparatively (with the jarosite process) uneconomic technique for decomposing ferrite.

Many other processes for handling zinc ferrites, such as the E.Z. process (Australian Pat. No. 424,095, May 15, 1970; U.S. Pat. No. 3,781,405, Dec. 25, 1973), and chlorination roasting (A. Roeder, H. Junghanns and H. Kudelka, J. of Metals, 12, pp. 31-37, 1969), have been proposed but are presently not employed commercially to the knowledge of the inventors.

The primary object of this invention is to provide a method for recovering zinc preferably from relatively lowgrade zinc-bearing concentrates with less difficulty than the previous methods involving complex iron-removal processing.

Another object of this invention is to provide such a zinc-recovering method as above, wherein said method can be combined with conventional dead roasting method to the overall benefit of the zinc recovery process.

A further object of this invention is to provide a method for recovering non-ferrous metals soluble in sulphuric acid from a concentrated sulphuric acid solution which contains said metals and iron as sulphates, with less difficulties than previous methods involving complex iron-removal processing prior to electrolysis or other metal recovery processes.

In one aspect of this invention there is provided a method for recovering at least one non-ferrous metal soluble in sulphuric acid from a strong sulphuric acid solution containing said metal and iron as sulphates, said method comprising the following consecutive steps:

subjecting said solution in a sub-divided form to thermal decomposition in a fluidized bed reactor at a temperature of from 600° to 750° C. with 20-150% excess air for an average retention time of 1-12 hours to obtain calcine containing ferric oxide and the sulphate of said non-ferrous metal;

leaching said non-ferrous metal sulphate out from said calcine with water or dilute sulphuric acid solutions;

separating said leach solution containing said non-ferrous metal sulphate from the residue; and recovering said non-ferrous metal from said leach solution, via electrolysis or any other method.

In a further aspect of this invention there is provided a method for recovering at least one non-ferrous metal soluble in sulphuric acid from a solid material containing said non-ferrous metal and iron, comprising:

(a) roasting said material in a subdivided form in a fluidized bed reactor at a temperature from 600° to 750°

C., with 20-150% excess air for an average retention time of 1-12 hours resulting in an atmosphere comprising $SO_2$, $SO_3$, water vapor and remaining $O_2$ and $N_2$ from the air, to obtain a calcine containing ferrite and sulphates, oxysulphates and oxides of said non-ferrous metal, plus hematite;

(b) leaching said calcine with water or dilute sulphuric acid solution in such a manner that the sulphates, oxysulphates, and oxides of said non-ferrous metals are leached out in part from the calcine into the water or dilute sulphuric acid solution;

(c) subjecting the leach pulp resulted from step (b) to a liquid-solid separation step to yield a leach solution suitable for purification-metal recovery steps for said non-ferrous metal;

(d) leaching the solid residue resulted from step (c) with strong sulphuric acid solution in such a manner that the ferrite and unreacted sulphides of said non-ferrous metal are converted to the sulphates of iron and said non-ferrous metal;

(e) subjecting the pulp resulted from step (d) to a liquid-solid separation step to obtain a leach solution containing said sulphates of iron and said non-ferrous metal; and (f) recycling a said solution obtained in step (e) into said fluidized bed reactor in a subdivided form to convert the sulphates of iron to ferric oxide, $SO_2$ and $SO_3$ and sulphuric acid to $SO_2$, $SO_3$ and gaseous $H_2O$.

In a still further aspect of this invention there is provided a method set forth in the immediately preceding paragraph, in which calcine from a dead roaster and calcine from the sulphation fluidized bed reactor are leached with dilute sulphuric acid solution(s) and the strong acid leach solution is recycled to the sulphation roaster.

The present invention will be more fully appreciated by the following detailed description of embodiments of the invention, referring to the accompanying drawings, in which.

Figure 6A:
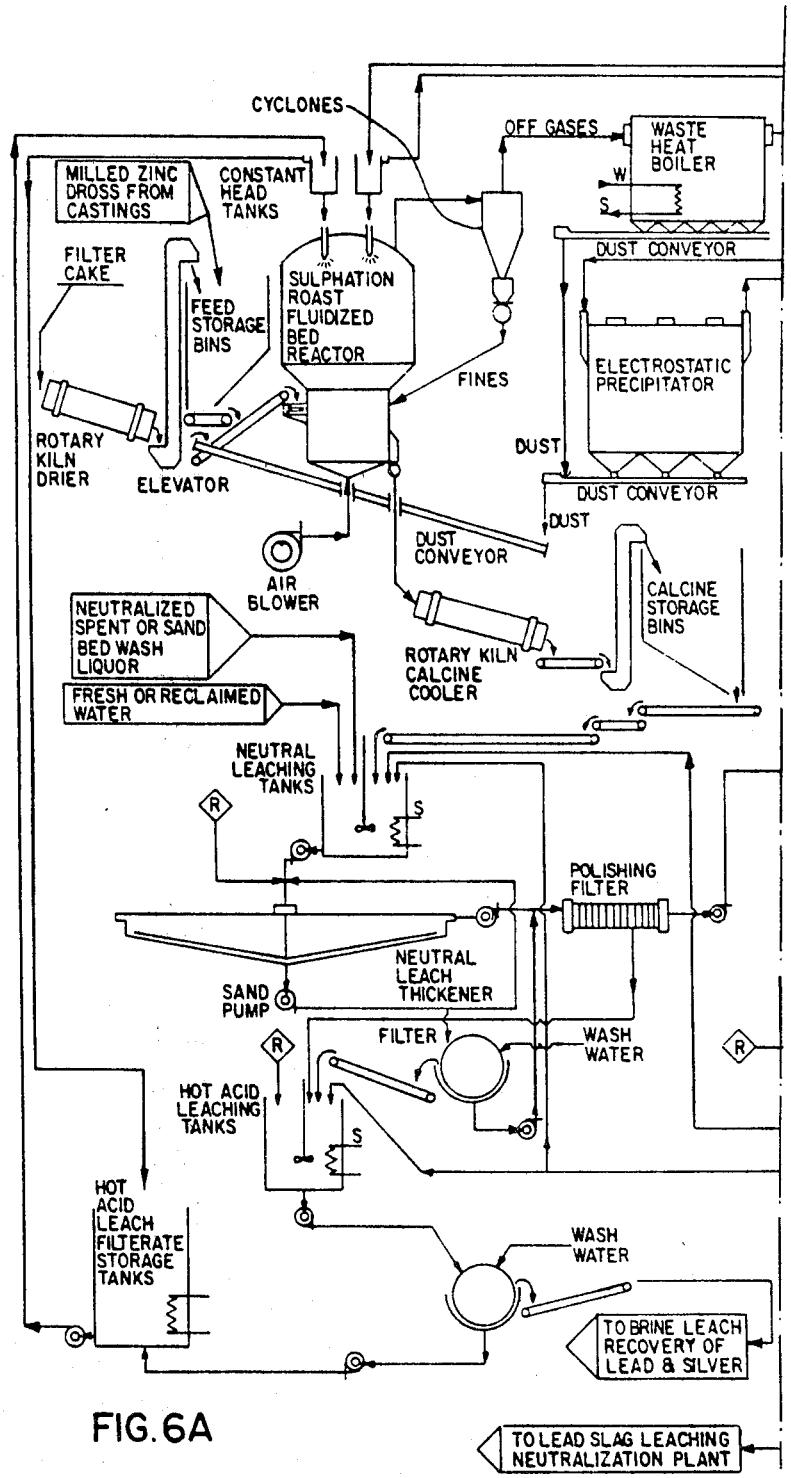
Figure 6B:
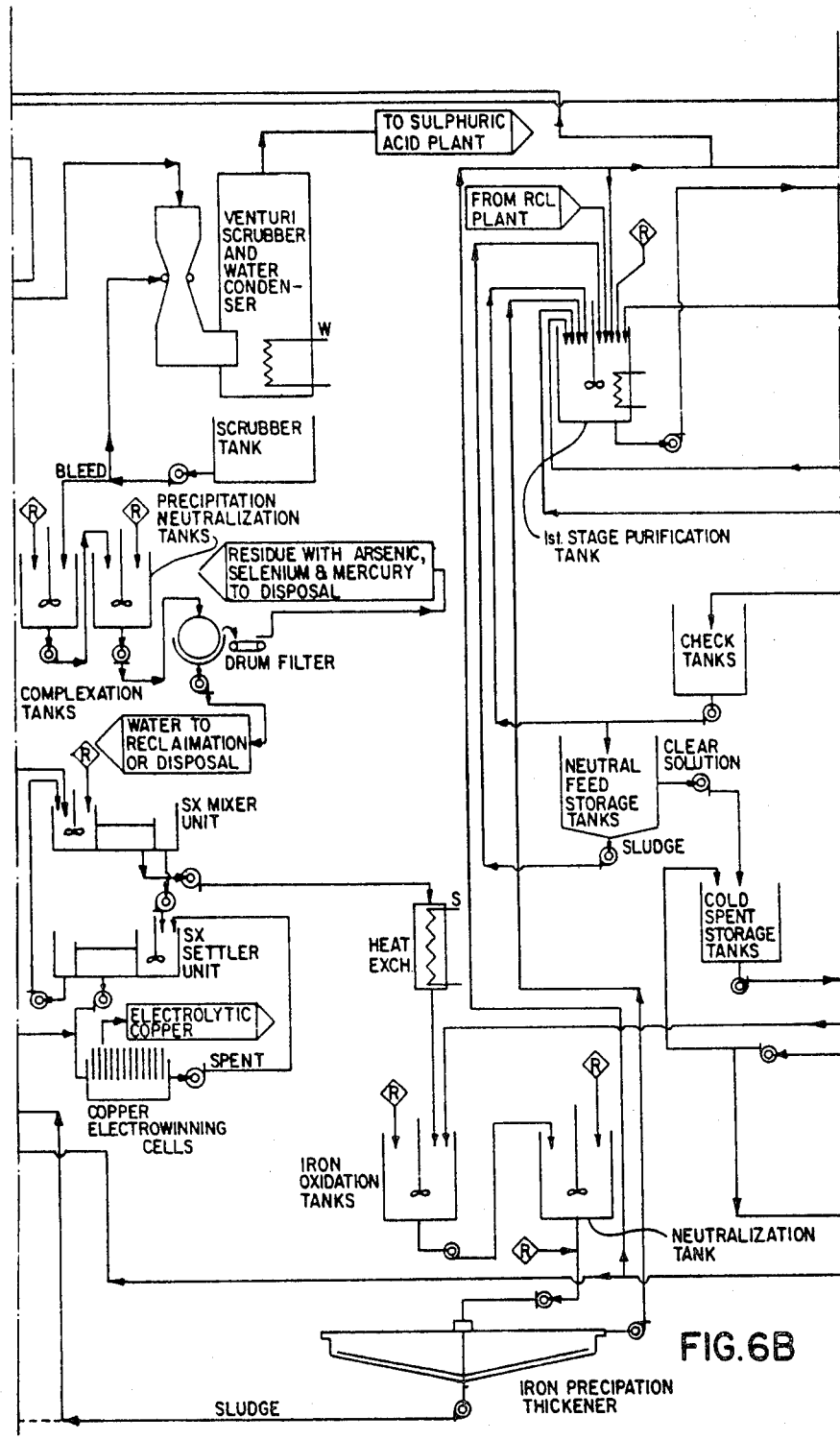
Figure 7A:
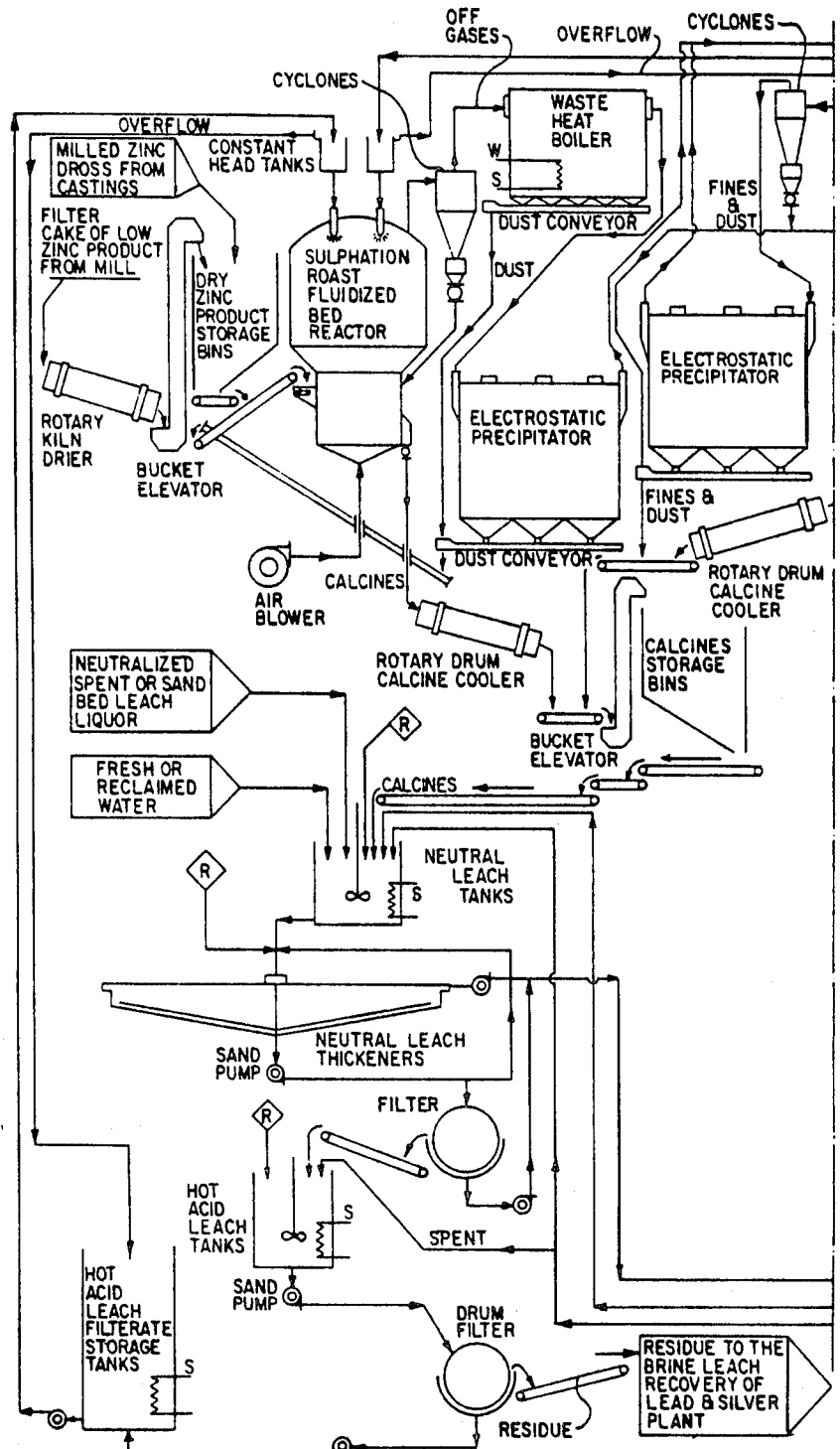
Figure 7B:
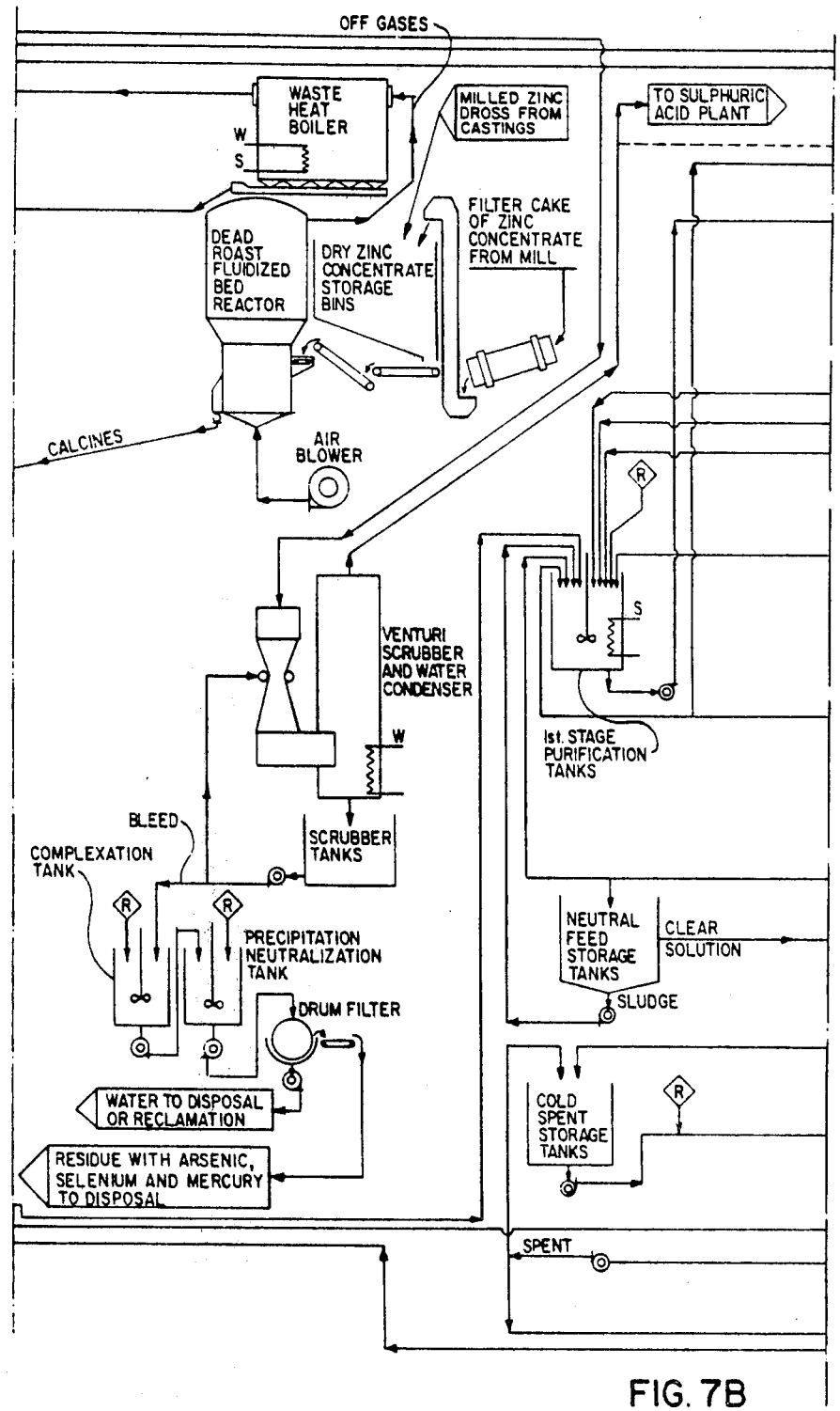

FIGS. 6A to 6C when combined as set our in FIG. 6B form a schematic plant layout related to Example 1; and FIGS. 7A to 7C when combined as set out in FIG. 7D form a schematic plant layout related to Example 2.

In the present invention, the difficulties and complexities of treating and separating the iron in solution after the ferrite or other zinc residues are leached are substantially eliminated by thermal decomposition of the strong sulphuric acid leach solution at 600°–750° C. in a fluidized bed reactor. Use is made of the excess heat produced from the oxidation and sulphation reactions of the feed in the bed. The zinc and other metals such as copper remain as solid sulphates and oxysulphates in the roaster calcines and can be recovered totally or in part with a water or dilute sulphuric acid leach. All iron sulphates in the strong acid leach solution are decomposed in the roaster to hematite and $SO_2$ and $SO_3$, and the sulphuric acid to $H_2O$, $SO_2$ and $SO_3$. The hematite remains inert in the subsequent water or dilute sulphuric acid leach.

The present invention overcomes one of the major limiting factors in current electrolytic zinc plant practice, i.e., the handling of relatively high-iron-containing zinc concentrates.

In conventional dead roasting processes a bulk of iron in a zinc concentrate serves to tie up zinc as ferrite (Zn $Fe_2O_4$) in calcine. As a result, high-iron zinc concentrates are generally considered to be unsuitable feed to most existing electrolytic zinc plants. However, in sulphation roasting only a little fraction of the iron ends up as ferrites, the remainder forms hematite ($Fe_2O_3$). A low grade zinc concentrate, for example, of 30% by weight of Zn and 22% by weight of Fe, in a sulphation roast, would result in less than 15% by weight of the total zinc as ferrite, whereas a conventional dead roast of the same concentrate might tie up approximately 40% of the zinc as ferrite. Fence the combination of a sulphation roast plus the recycle of the strong sulphuric acid leach filtrate of the ferrite residue back to the sulphation roaster can be used to treat low grade zinc concentrates which are not amenable to current electrolytic zinc plant technology.

This invention then is of special interest to producers of zinc concentrates from ores where physical constraints such as grinding liberation result either in low grade concentrates or unacceptably high metal losses to tailings. Such losses generally result in a compromise in producing concentrates of a grade acceptable to current electrolytic zinc plants.

Any metal-rich sulphate solution derived either from leaching of roaster calcines or leach residues or other metallurgical slags, but most particularly those leach solutions high in iron, such as would be derived from strong sulphuric acid leaching of ferrite residues which would require a post-leach iron removal stage, are suitable feed solutions for decomposition in a fluidized bed roaster under sulphating conditions. Also suitable are certain bleed and waste streams from metallurgical plants, which carry metals such as zinc and copper as well as iron, e.g., pickling liquors.

Figure 1:
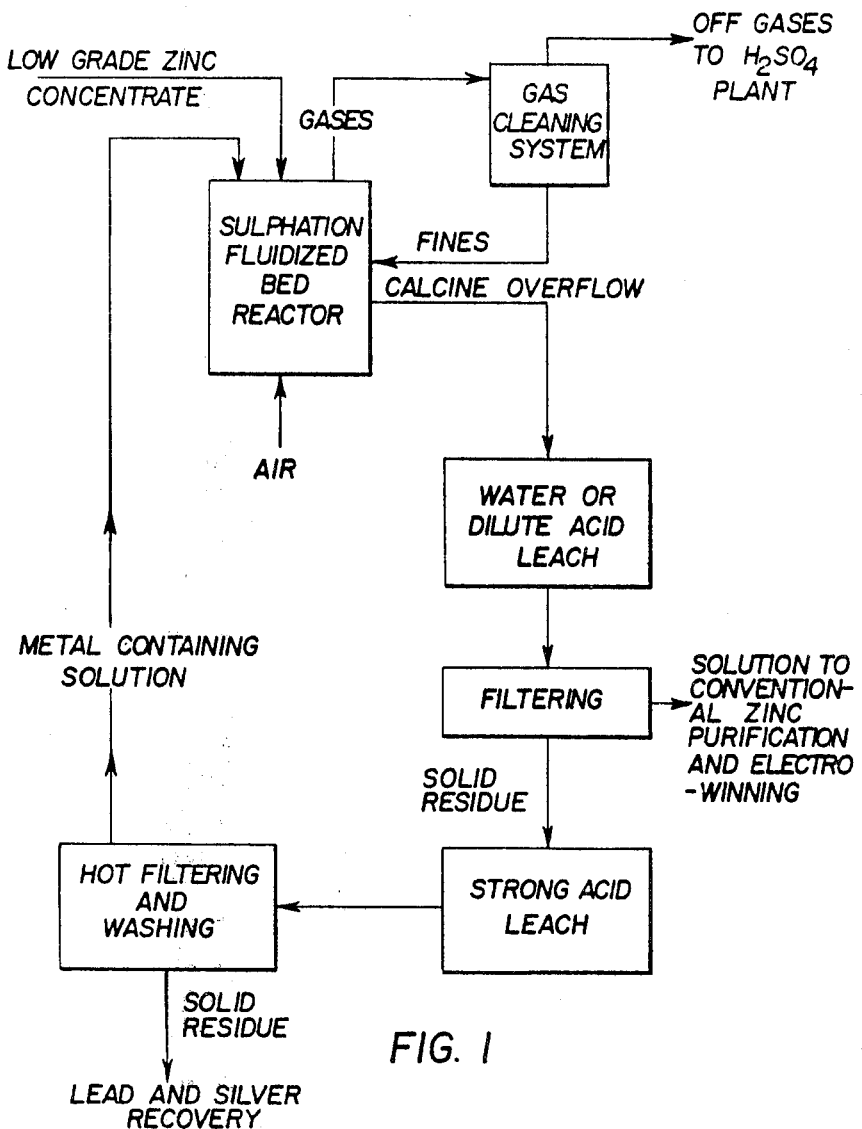
FIG. 1 is a schematic flow sheet illustrating an embodiment of the sulphation roasting process applied to a low grade zinc concentrate according to this invention.

Referring now to FIG. 1, the leaching of refractory zinc compounds such as zinc ferrite residue resulting from dilute sulphuric acid leaching is carried out continuously at over 40° C. for over one-half hour at a pH less than 2.0, but preferably at 95° C., with 40 gpl free $H_2SO_4$ for 2 hours. Under these preferable conditions over 95% of the zinc from zinc ferrite and greater than 85% of the zinc from remnant sphalerite can be leached. To achieve highest extraction of zinc from sphalerite it is desirable that the zinc ferrite/sphalerite ratio not be less than 3/1. The ferric iron from dissolved ferrite is the principal leaching agent in dissolving sphalerite.

The pulp, after the strong sulphuric acid leaching step, is filtered in a filter press or any other suitable equipment, and the residue, predominantly hematite, is washed with hot water or hot dilute sulphuric acid, preferably over 90° C. with a volume preferably no larger than about two times the volume of the entrapped water in the residue.

The solution coming from the filtering step, is then thermally decomposed by spraying with compressed air, or any other suitable method, into a suitable reactor such as a fluidized bed that operates at over 600° C., with over 20% excess air over the stoichiometric and with an average retention time for the solid over 1 hour, but preferably at 685° C. with 85% excess air and for 5.5 hours average retention time. The solution contains up to 225 gpl Fe as $Fe_2(SO_4)_3$ and $FeSO_4$, 200 gpl Zn as $ZnSO_4$, 100 gpl Cu as $CuSO_4$, 300 gpl $H_2SO_4$, and some impurities such as As.

At the temperature of the reactor, water from the solution vaporizes readily, followed by the thermal decomposition of iron sulphates to $Fe_2O_3$ and $SO_2$ and $SO_3$ and sulphuric acid to $SO_2$ and $SO_3$ and $H_2O$. These endothermic reactions are as follows:

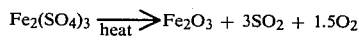

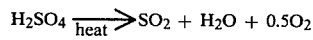

$ZnSO_4$ and $CuSO_4$, which are thermodynamically stable at 685° C. remain as such in the small porous pellets formed during the spraying of the solution, and act as binder for the hematite formed from the decomposition of the iron sulphates. The pellets, which become fully mixed with the calcine inside the fluidized bed, increase the size distribution in the total bed material and hence also considerably improve the fluidization properties of the calcine. The thermodynamic stability of these three compounds, $ZnSO_4$, $CuSO_4$ and $Fe_2O_3$ is illustrated from the combined phase diagrams for the systems Zn—S—O, Cu—S—O and Fe—S—O at 685° C., shown in FIG. 5. Under all roasting conditions for $SO_2$ concentrations of 3 to 15%, $ZnSO_4$ and $CuSO_4$ are the only stable sulphates while iron sulphates decompose to $Fe_2O_3$. For $SO_2$ concentrations less than about 2%, some copper and zinc oxysulphates can be present, which also are soluble in dilute sulphuric acid.

Figure 5:
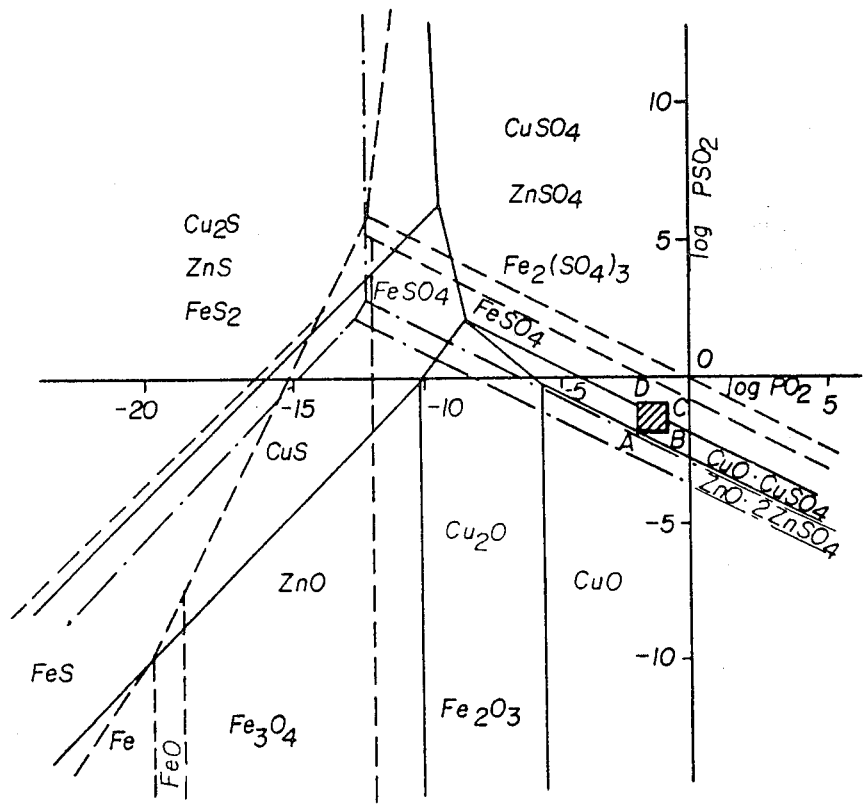
FIG. 5 is a phase stability diagram.

FIG. 5 illustrates the normal range for $SO_2$ and $O_2$ composition in sulphation roasting. The shadowed area ABCD represents conditions where at C the gases in the roaster contain 10% $SO_2$ and 10% $O_2$. The stable compounds formed under these conditions are $ZnSO_4$ and $CuSO_4$, which are soluble in water or dilute acid and $Fe_2O_3$, which is insoluble in water or weak acid.

Any increase in $SO_2$ concentration from point C will favour the formation of $FeSO_4$ which is a water or dilute acid soluble compound and hence would result in increased quantities of iron in leach solutions which would be an undesirable feature in zinc plant practice.

Diagonally opposite from C at point A, where the gas is composed of 1% $SO_2$ and 1% $O_2$, $ZnSO_4$, $Fe_2O_3$ and $CuO.CuSO_4$ are the stable phases. Any further downward trend from A i.e. lower $SO_2$ concentration, will favour the formation of $ZnO.2ZnSO_4$. This should also be avoided as $ZnO.2ZnSO_4$ can react with $Fe_2O_3$ during roasting to form $ZnFe_2O_4$ (ferrite) which is soluble only in strong acid solutions.

At point B, (1% $SO_2$, 10% $O_2$) both $CuSO_4$ and $CuO.CuSO_4$ are stable phases with $ZnSO_4$ and $Fe_2O_3$.

At point D (10% $SO_2$, 1% $O_2$) the compounds formed are the same as at point C.

A decrease in roasting temperature will displace all phase boundaries in FIG. 5 towards the lower left. This will effectively increase the stability fields of all sulphates including the iron sulphates, $FeSO_4$ and $Fe_2(SO_4)_3$. As the iron level in leach solutions should be kept to a minimum, it is important that the roasting temperature not be appreciably below 685° C. Conversely, increasing roasting temperatures above 685° C. will favour the formation of $ZnO.2ZnSO_4$ and undersirable ferrite. The latter being formed either directly or by reaction of $ZnO.2ZnSO_4$ with $Fe_2O_3$.

Volatile impurities such as As, Sn, Sb, Cl, etc., achieve an equilibrium balance in the calcine and hence virtually all freshly introduced volatiles exit with the off gases.

The discharge from the roaster overflow, which represents 100% of the reactor discharge since the elutriated solids in sulphation roasting are continuously recirculated back to the reactor, is then cooled in a rotary cooler or other suitable device. Leaching is carried out in water or dilute sulphuric acid but generally with dilute sulphuric acid under conditions over 15° C., pH 7.0 or lower and over one-half hour retention time, but preferably similar to conditions employed in 'neutral leach' circuits in conventional electrolytic zinc plants.

When a dilute sulphuric acid leaching is used in this step, all $ZnSO_4$, $CuSO_4$, and most of the zinc and copper oxysulphates are solubilized. The pulp is settled or filtered. The filtrate generally contains up to 180 gpl Zn, 50 gpl Cu, with less than 1 gpl Fe. The residue consists mostly of hematite and also of small amounts of zinc precipitated from the oxysulphate, plus all of the ferrite and remnant sphalerite produced from the fresh feed to the roaster. This residue is then leached with strong sulphuric acid as described above.

The process therefore incorporates a closed loop where the zinc present as ferrite and sphalerite in the residue from the dilute sulphuric acid leach is solubilized in hot strong sulphuric acid and the resultant metal/sulphate solution is decomposed in the fluid bed reactor. In this manner, virtually all of the zinc and copper are effectively recovered through the 'neutral leach' circuit to purification with solutions containing less than 1 gpl iron. Thus the need for complex iron precipitation and disposal procedures such as those required in the jarosite process is substantially simplified.

The level of copper in the roaster feed material and its concentration in the dilute sulphuric acid leach filtrate determine a suitable procedure for copper recovery. If the copper content is sufficiently high, then solvent extraction, with or without electrowinning may be incorporated in the purification circuit; otherwise the copper would be cemented as in conventional zinc plant practice.

An added advantage of this process is in the increased strength of the $SO_2$ and $SO_3$ in the dry roaster off gases. The concentration of these gases is increased by as much as 30% with the decomposition of the strong sulphuric acid leach solution recycle in the roaster. This increased gas strength is desirable for the manufacture of sulphuric acid from roaster off gas.

Figure 2:
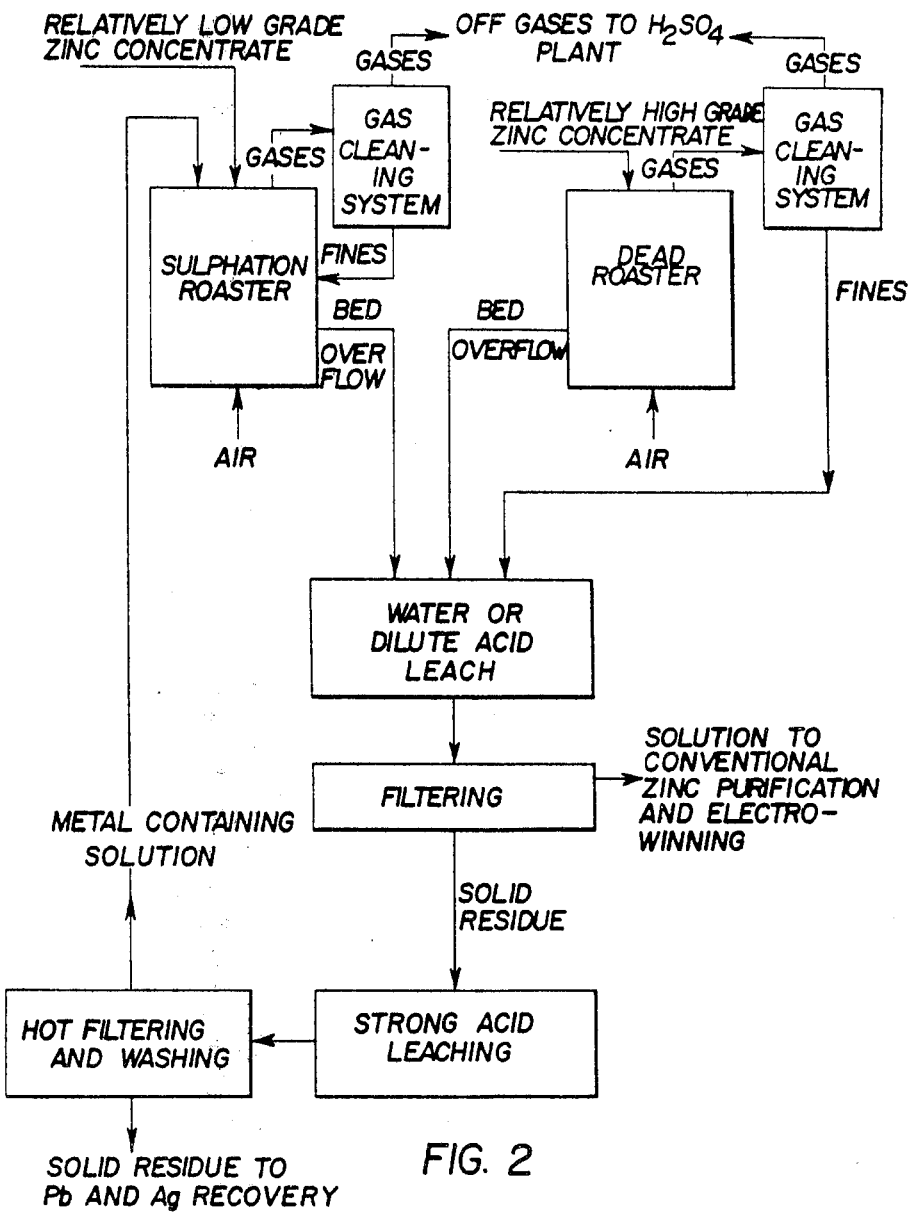
FIG. 2 is a schematic flow sheet illustrating an embodiment of the integrated sulphation roasting and dead roasting processes applied to a low grade zinc concentrate and a high grade zinc concentrate, respectively, according to this invention.

As illustrated in FIG. 2, the sulphation roasting process of this invention can be used in conjunction with conventional dead roasting of standard zinc concentrates to eliminate the jarosite or other iron precipitation stages in conventional electrolytic zinc plants. The sulphation reactor operates at a temperature between 600° and 750° C., preferably at 685° C., and the dead roast at a temperature between 880° C. and 1000° C., preferably at 930° C. Calcines discharging from both reactors are cooled as in conventional zinc plant practice and described above with respect to the embodiment illustrated in FIG. 1. The residue, after dilute sulphuric acid leaching and subsequent filtering, contains all the ferrite and remnant sphalerite produced in both sulphation and dead roasting operations, and is subjected to a strong sulphuric acid leaching in the manner described above to dissolve the ferrite and most of the sphalerite. The pulp is filtered as described above and the filtrate is then recirculated back into the sulphation reactor to decompose the iron sulphates and sulphuric acid and recover the zinc and copper in the same manner as described above. The two stage leaching operation can be carried out on a combined calcine from both the sulphation roaster and dead roaster, as illustrated in FIG. 2, or in separate leach trains or in semi separate circuits with the final strong acid leach solutions being recycled to the sulphation roaster.

The strong sulphuric acid leach filtrate must be decomposed in the sulphation reactor, where conditions preclude the formation of much ferrite from the solution. At dead roast temperatures most if not all of the iron in solution would combine again with zinc to form zinc ferrite.

As the level of ferrite (and sphalerite) dissolution in the strong sulphuric acid leach is much higher in the present sulphation roasting process than in conventional zinc plant practice, i.e., over 95% dissolution versus 70%, overall zinc extraction from the dead roast calcine using the present sulphation roasting process, will be improved. Together with the high extraction of zinc and copper, the iron precipitation problem, which is characteristic of current electrolytic zinc plant practice is reduced, as substantially all iron is converted to insoluble, easily filterable, $Fe_2O_3$ (hematite), in the calcine. This effectively eliminates the requirement for a jarosite or other iron precipitation process now required in conventional electrolytic zinc plants.

The thermal balance in the integrated sulphation roasting-dead roasting can be adjusted in such a form that all of the strong sulphuric acid leach solution recycle resulting from the dissolution of both ferrite residues from the sulphation and dead roasting neutral leach can be decomposed in the sulphation roaster keeping the thermal balance with no external fuel addition. For example, when a concentrate of 30.6% Zn by weight is used in the sulphation roasting and a 55% Zn by weight concentrate as feed for the dead roaster, the feed ratio to the sulphation roaster/dead roaster should be equal or greater than 1.45/1. In this case, the sulphation roaster is thermally autogeneous and no external fuel is required. If this ratio is less than 1.45, additional fuel would be required for the sulphation roaster in a form of natural gas, oil or other fuel to maintain the thermal balance.

A feed ratio of 1.45 represents about 45% of the zinc produced from the sulphation roaster using said feed of 30.6% Zn by weight, and 55% of zinc produced from the dead roaster using said feed of 55% zinc by weight. This ratio nevertheless is dependent on the grade and mineralogy of the products used and the ratio 1.45 applies only for the 30.6 and 55% Zn case where the dominant minerals in the concentrates are sphalerite and pyrite. Also this ratio does not take into consideration heat available in the roaster freeboard for decomposing the strong acid leach solutions, in which case a substantial decrease in the ratio may be achieved. Also, the ratio calculation is based on a combined sulphation roast-dead roast calcine leach. If separate leach trains are used the ratio could be decreased further.

Figure 3:
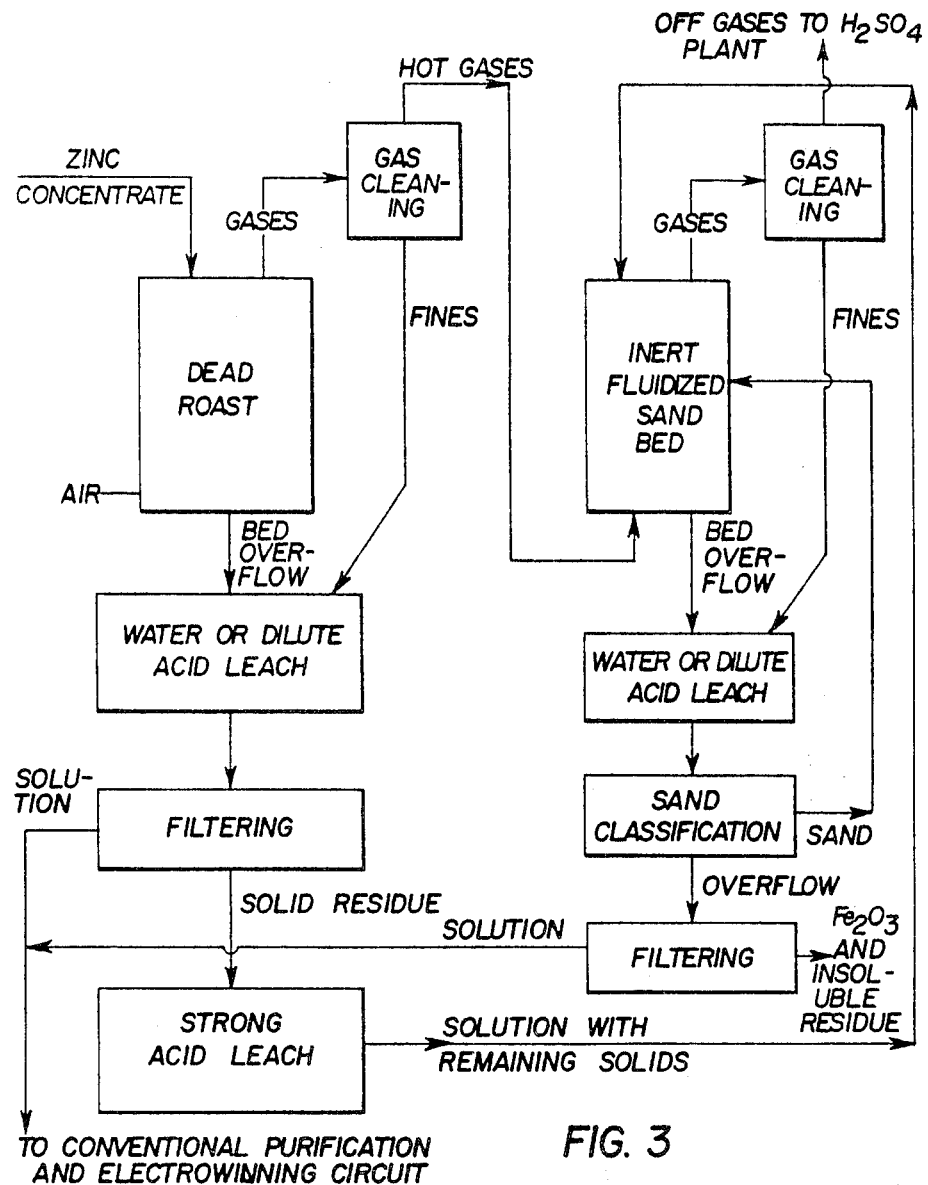
FIG. 3 is a schematic flow sheet illustrating an embodiment of the sulphation roasting process according to the present invention, applied to treat ferrite residues from a dead roasting of high grade zinc concentrates operation alone.

The sulphation roasting process according to this invention can be used to treat ferrite residues from a dead roasting operation alone, as illustrated in FIG. 3. In this case, the ferrite residues are leached in the same manner as described above.

The pulp following the strong acid leach contains little solids and can be recycled, in total, as a spray to an inert fluidized sand bed at a temperature between 600 and 750° C., preferably 685° C. The hot gases from the dead roasting operation, after cyclone cleaning, can be used to fluidize a bed of sand such as fine quartz or any other inert solid material of a size range approximating from No. 140 to No. 10 in the U.S. standard sieve series (105 $\mu$m to 2000 $\mu$m). The off gases from the dead roaster, at about 900° C., vaporize and decompose the strong sulphuric acid leach filtrate sprayed into the inert fluidized sand bed reactor in the same manner as explained above. In this way the zinc from the solution is recovered as zinc sulphate, while the iron decomposes to inert hematite. To achieve proper decomposition, the bed is maintained at 685° C. by balancing the amount of gas passed through the bed with the amount of solution decomposed. The bed overflow, consisting of sand and the small pellets of zinc sulphate and hematite, is subjected to a water or dilute acid leach, for example 25 gpl $H_2SO_4$, to recover the zinc. The sand is then classified and recirculated back to the reactor.

This alternative for handling ferrite residues from zinc plants has several advantages over present conventional techniques such as the jarosite process. No additional external energy over that extracted from the dead roaster off gas is required, iron forms as relatively easily filterable hematite and the zinc solution can be easily integrated with the main zinc electrolytic circuit. In addition, the quantity and concentration of $SO_2$ and $SO_3$ dry off gas from the roaster is increased by the decomposition of the iron sulphates and sulphuric acid in the sand bed. The sand bed itself also acts as a dust collector, simplifying the cleaning system for the bed off gases. The iron (hematite) residue as a waste produce is less voluminous than normal jarosite residues and in general would reduce environmental problems.

Figure 4:
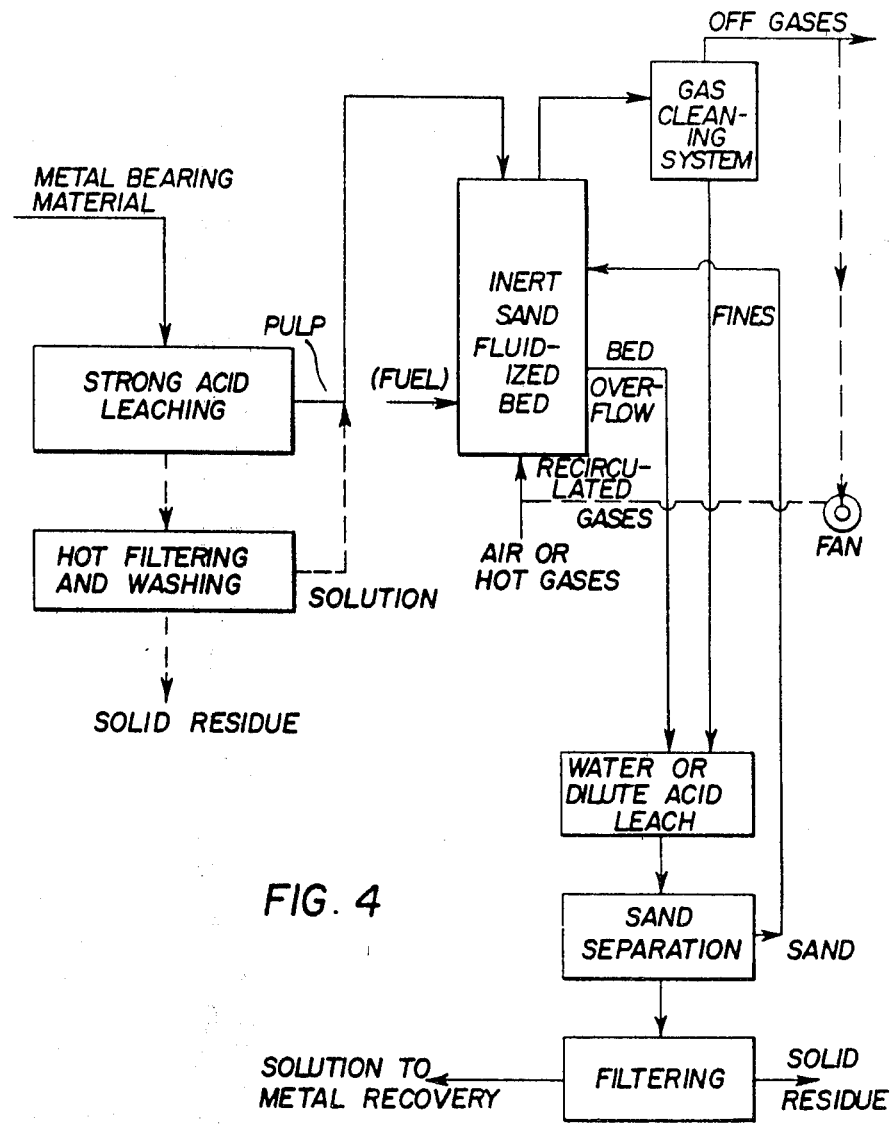
FIG. 4 is a schematic flow sheet illustrating an embodiment of the sulphation roasting process according to the present invention, applied for the recovery of metals from a solution containing sulphates of said metals and iron by thermal decomposition of the iron sulphates to ferric oxide.

The application of the sulphation roasting process according to this invention can be further extended to recover any metals which are soluble in sulphuric acid, as illustrated in FIG. 4. The metal-bearing material is leached with strong sulphuric acid solution in the manner described above. The pulp, if it contains insolubles, is filtered and the filtrate decomposed in a fluidized bed at a temperature between 600 and 750° C., preferably 685° C. The bed can be similar to the inert fluidized sand bed described above with respect to the embodiment in FIG. 3, using hot gases from other operations or by heating the reactor with a suitable fuel such as natural gas, coal, oil, etc. The bed overflow, containing the soluble metal pellets with the hematite and the inert sand is subjected to a water or dilute acid leach and the sand is then separated, filtered, and the solution is further treated to recover the metal values. For example, this can be applied to the leaching of slags from a lead smelter to recover zinc as an alternative to the zinc fuming process.

EXAMPLE NO. 1

Application to a Sulphation Roast-Leach-Electrowinning Process for Relatively Low Grade Zinc Concentrates A zinc middlings products from a zinc-lead-copper flotation mill assaying 30% Zn, 3.6% Pb, 0.6% Cu and 22.38% Fe, with principal mineral components being sphalerite, galena, chalcopyrite and pyrite, was roasted in a continuous semi-pilot fluid-bed reactor at a rate of 120 kg per day under conditions where zinc, lead and copper are selectively sulphated and iron forms the oxide hematite. Sulphation roasting was carried out at 685° C. with 85% excess air for an average retention time of 6.0 hours. Calcines from the overflow were leached with dilute sulphuric acid solution (containing 50 gpl Zn) at 50° C., 1.5 hours retention time at constant pH 4. The pulp from this dilute sulphuric acid leach was filtered and the solid residue leached in concentrated acid of constant 40 gpl free $H_2SO_4$ for a 2-hour retention time at 95° C. The strong sulphuric acid leach pulp was filtered, washed with hot water and the filtrate sprayed inside the same fluidized bed reactor which produced the calcine. The results are as follows:

|  | (by weight) |
|---|---|
| Initial Zn extraction in dilute sulphuric acid from calcine | = 84.6% |
| Initial Cu extraction in dilute sulphuric acid from calcine | = 80.8% |
| Secondary Zn extraction in strong sulphuric acid from residue | = 90.3% |
| Secondary Cu extraction in strong sulphuric acid from residue | = 89.5% |
| Overall extraction in dilute acid from calcine including decomposed strong acid leach filtrate | |
| Zn | = 98.5% |
| Cu | = 98.0% |
| Fe | = 0.9% |
| Final dilute acid leach filtrate contains: | |
| Zn | = 150.0 gpl |
| Cu | = 1.8 gpl |
| Fe | = 0.7 gpl |

By comparison, concentrates with levels of zinc and iron indicated in this example (30% Zn, 22.38% Fe) would not be generally acceptable to conventional dead roast-electrolytic zinc plants. An unacceptable amount of zinc would end up as ferrite in the dead roast calcine and this would necessitate the handling of much more iron via precipitation techniques such as are used in the Jarosite process. The cost per unit of recoverable zinc would be much higher than for higher grade concentrates and the overall zinc recoveries would be approximately 10% less than would be achieved by the sulphation roast process outlined in Example 1.

The basic flow sheet for this example is illustrated in principle in FIG. 1. FIG. 6 is a schematic plant layout for a proposed sulphation roast-leach-electrowinning plant to treat this type of product.

EXAMPLE NO. 2

Application to an Integrated Sulphation Roast-Dead Roast-Leach-Electrowinning Plant A zinc middlings product from a zinc-lead-copper flotation mill assaying 32.03% Zn, 0.55% Cu, 3.50% Pb and 22.53% Fe, with principal mineral components being sphalerite, galena, chalcopyrite and pyrite, was roasted in a continuous semi-pilot fluidized bed reactor at a rate of 120 kg per day under conditions where zinc, copper and lead are selectively sulphated and iron forms the oxide hematite. Sulphation roasting was carried out at 685° C., with 80% excess air for an average retention time of 6.0 hours.

Calcines from the sulphation roasting operation were combined in an equivalent weight ratio of the middlings and concentrate feeds of 1.43 to 1 with dead roasted calcines produced from a zinc concentrate containing 54.9% Zn, 0.57% Cu, 0.60% Pb and 10.37% Fe, and leached together with dilute sulphuric acid solution (containing 50 gpl Zn) at 50° C. for 1.5 hours retention time at constant pH 4. The pulp from this dilute sulphuric acid leach was filtered and the solid residue submitted to a strong acid leach at constant 40 gpl free $H_2SO_4$ for a two hours retention time at 95° C. The resulting pulp was then filtered and washed with hot water and the filtrate and wash solution obtained were continuously sprayed inside the sulphation fluidized bed reactor. Reactor operates without external thermal energy. Resulting calcine was leached with a dilute sulphuric acid solution (50 gpl Zn) for 1.5 hours at pH 4 at 50° C. The results are as follows:

| | |
|---|---|
| Initial Zn extraction in dilute sulphuric acid from combined calcines | = 86.5% |
| Initial Cu extraction in dilute sulphuric acid from combined calcines | = 52.9% |
| Secondary Zn extraction in strong sulphuric acid from common residue | = 87.6% |
| Secondary Cu extraction in strong sulphuric acid from common residue | = 96.3% |
| Overall extraction in dilute acid from both calcines, including the decomposed strong acid leach filtrate | |
| Zn | = 98.3% |
| Cu | = 98.3% |
| Fe | = 1.0% |
| Final dilute acid leach filtrate contains: | |
| Zn | = 149.50 gpl |
| Cu | = 1.41 gpl |
| Fe | = 0.60 gpl |

When potassium permanganate was added to the dilute acid leach at 150% of stoichiometric for ferrous oxidation to ferric with simultaneous air spraying of the leach solution, the iron level in dilute acid leach liquor dropped to less than 0.02 gpl.

By comparison, with conventional dead roast zinc plant practice, the overall zinc recoveries via the integrated sulphation roast-dead roast are improved by approximately 1.5%. Whereas ferrite dissolution by strong acid leaching of ferrite residues in conventional zinc plant practice seldom exceeds 70%, dissolution of ferrite from the integrated sulphation roast-dead roast plant approaches 90%. Also important is the simplification of the plant through the elimination of the iron precipitation stage such as the Jarosite process.

The basic flow sheet for this example is illustrated in principle in FIG. 2. FIG. 7 is a schematic plant layout for a proposed integrated sulphation roast-dead roast plant.

EXAMPLE NO. 3

Application to a Conventional Dead Roast Zinc Plant to Replace the Iron Precipitation Stage as Exemplified by the Jarosite Process A ferrite residue containing 36.4% Zn, 2.7% Cu and 53.7% Fe, obtained from the neutral leach of a dead roasted zinc concentrate, was submitted to strong sulphuric acid leaching at a constant level of 40 gpl $H_2SO_4$ for two hours at 95° C. The resulting pulp was filtered and washed with hot water and the filtrate obtained sprayed into a semipilot fluidized bed reactor at a flow rate of 94 lt/day. The bed in the fluidized bed reactor consisted of silica sand, having a size range between No. 140 to No. 60 (195 μm to 250 μm) in the U.S. Standard Sieve Series. The small pellets formed by decomposition of the solution sprayed and the sand bed were fluidized with air. Heat was applied externally to maintain the temperature at 685° C.

The fluidized bed overflow discharged continuously into a quenching solution of pH 4 sulphuric acid to leach the zinc and copper from the pellets and sulphate-coated sand grains. The resulting pulp was filtered and washed to recover the dissolved zinc and copper from the insoluble sand, hematite and other impurities.

The results are as follows:

| | (by weight) |
|---|---|
| % Zn extracted in strong sulphuric acid from residue | = 85.1% |
| % Cu extracted in strong sulphuric acid from residue | = 97.8% |
| % Fe extracted in strong sulphuric acid from residue | = 94.2% |
| % Zn extracted from leaching of sand bed calcine | = 99.9% |
| % Cu extracted from leaching of sand bed calcine | = 99.9% |
| % Fe extracted from leaching of sand bed calcine | = <0.1% |
| Overall extraction of zinc from calcines in dilute acid leach, including the decomposed strong acid leach filtrate: | |
| % Zn extracted | = 98.1% |
| % Cu extracted | = 99.8% |
| % Fe extracted | = 0.7% |
| Final dilute acid leach filtrate contains: | |
| Zn | = 150.0 gpl |
| Cu | = 1.04 gpl |
| Fe | = 0.54 gpl |

When oxidants, such as $KMnO_4$ and air were added to the dilute acid leach, zinc and copper levels remain unchanged but iron dropped to less than 0.02 gpl.

By comparison with convention dead roast zinc plant practice, overall zinc recoveries are improved, using the sand bed decomposition of the strong acid filtrate, from 96.3% to 98.1%. A most important aspect of this invention is the elimination of the requirement for a complex iron precipitation process such as the Jarosite process from electrolytic zinc plant practice.

EXAMPLE NO. 4

Application to a Copper Leach Residue

A copper leach residue, from a roasted calcine, containing 9.2% Cu as cupric ferrite and minor amounts of covelite, 0.31% Co as cobalt ferrite $CoO.Fe_2O_3$, and 48.18% Fe as $Fe_2O_3$ was leached at 95° C. at a constant level of 50 gpl $H_2SO_4$ for 2.5 hours. The pulp was filtered and washed with hot water and the filtrate resulting was sprayed into a semi-pilot fluidized bed reactor at a rate of 67 lt/day. The bed in the fluidized bed reactor consisted of silica sand having a size range between No. 140 to No. 60 (105 μm to 250 μm) in the U.S. Standard Sieve Series. The small pellets formed by decomposition of the solution sprayed and the sand bed were fluidized with air. Heat was applied externally to maintain the temperature at 685° C.

The fluidized bed overflow discharged continuously into a quenching sulphuric acid solution of pH 4 to leach the copper and cobalt from the pellets and sulphate-coated sand grains. The resulting pulp was filtered and washed to recover the dissolved copper and cobalt from the insoluble sand, hematite and other impurities.

The results are as follows:

| | |
|---|---|
| % Cu extracted in strong sulphuric acid from residues | = 92.3% |
| % Co extracted in strong sulphuric acid from residues | = 88.9% |
| % Fe extracted in strong sulphuric acid from residues | = 26.0% |
| % Cu extracted from leaching of sand bed calcine | = +99.9% |
| % Co extracted from leaching of sand bed calcine | = 99.6% |
| % Fe extracted from leaching of sand bed calcine | = <0.1% |
| Overall extraction from sand bed calcines in dilute acid leach, including the decomposed strong acid leach filtrate: | |
| % Cu extracted | = 92.3% |
| % Co extracted | = 88.8% |
| % Fe extracted | = <0.1% |

When oxidants, such as $KMnO_4$ and air were added to the dilute acid leach, copper and cobalt levels remain the same but iron dropped to less than 0.03 gpl.

By comparison, when the strong acid leach filtrate is treated by iron cementation at 25° C. for 12 hours, recovery of Cu as copper cement dropped to 78.2% while no cobalt was recovered.

The best mode of application for carrying out the invention would be on low grade zinc concentrates, (i.e. less than 45% zinc) which otherwise would not be readily acceptable to conventional electrolytic zinc plants. The sulphation roasting of such concentrates can be carried out either alone as in Example 1, or in combination with a conventional dead roast facility, as in Example 2.

The ferrite in the neutral leach residues are decomposed by strong sulphuric acid and the filtrate returned to the sulphation roaster as a coolant spray. Thermal decomposition of the filtrate in the roaster results in the contained iron being converted to the relatively insoluble $Fe_2O_3$ while zinc and copper remain as sulphates which are soluble in water and/or weak sulphuric acid.

Alternately the invention can be employed to replace present iron precipitation processes in conventional electrolytic zinc plants as shown by Example 3. The ferrite residues from conventional zinc plants are leached by strong sulphuric acid solution as in present practice. However, in place of the iron precipitation techniques, such as the Jarosite process, which are presently employed the filtrate is decomposed in an inert fluidized sand bed under sulphating conditions. The iron sulphates are decomposed to the relatively insoluble stable $Fe_2O_3$ and as such the iron levels in the subsequent leach filtrate derived from the sand bed calcine are sufficiently low for the solution to be blended with the main zinc plant neutral leach solution entering the purification circuit without requirement for an iron precipitation stage such as the Jarosite process.

We claim:

1. A method for recovering zinc from a strong sulphuric acid solution containing zinc and iron as sulphates or from zinc sulphide ores or concentrates, comprising:
- (a) roasting said sulphate or zinc sulphide ore or concentrate in a subdivided form in an inert fluidized bed reactor at a temperature from 600 to 750° C. with 20-150% excess air for an average retention time of 1-12 hours resulting in an atmosphere comprising $SO_2$, $SO_3$, water vapour and remaining $O_2$ and $N_2$ from the air, to obtain a calcine containing ferrite and sulphates, oxysulphates and oxides of zinc, plus hematite;
- (b) leaching said calcine with water or dilute sulphuric acid solution in such a manner that the sulphates, oxysulphates, and oxides of zinc are leached out in part from the calcine into the water or dilute sulphuric acid solution;
- (c) subjecting the leach pulp resulting from step (b) to a liquid-solid separation step to yield a leach solution suitable for purification-metal recovery steps for zinc;
- (d) leaching the solid residue resulting from step (c) with strong sulphuric acid solution in such a manner that the ferrite and unreacted sulphides of zinc are converted to the sulphates of iron and zinc;
- (e) subjecting the pulp resulting from step (d) to a liquid-solid separation step to obtain a leach solution containing said sulphates of iron and zinc; and
- (f) recycling said sulphate solution obtaining in step (e) in a subdivided form into an inert fluidized bed in such a manner that the dry calcine contains zinc sulphate and iron sulphate and/or hematite, said inert fluidized bed being fueled by the off gas from roasting step (a).

2. The method as defined in claim 1 wherein zinc is recovered from the leach solution resultant from step (c).

3. A method for recovering zinc from a strong sulphuric acid solution containing zinc and iron as sulphates or from zinc sulphide ores or concentrates, comprising:
- (a) roasting said sulphate or zinc sulphide ore or concentrate in a subdivided form in a fluidized bed reactor operating under zinc sulphide concentrate dead roasting conditions, at 880° to 1000° C. whereby a calcine containing ferrites and oxides of zinc is obtained;
- (b) leaching said calcine with water or dilute sulphuric acid solution in such a manner that the zinc oxide is leached out into the water or dilute sulphuric acid solution;
- (c) subjecting the leach pulp resulting from step (b) to a liquid-solid separation step to yield a leach solution suitable for purification-metal recovery steps for zinc;
- (d) leaching the solid residue resulting from (c) with strong sulphuric acid solution in such a manner that the ferrite and unreacted sulphides of zinc are converted to the sulphates of iron and zinc;
- (e) recycling said sulfates of zinc and iron obtained in step (d) in a subdivided form into an inert fluidized bed at 600° to 750° C. in such a manner that the dry calcine contains zinc sulphate and/or oxysulphate and most of the iron as hematite; and
- (f) subjecting the calcine from step (e) to a water or dilute sulphuric acid leach to recover the zinc.

4. A method as defined in claim 3 wherein step (e) is carried out using the off gas from step (a) as a fuel and/or fluidization source.

5. A method as defined in claim 4 wherein the bed of the fluidized bed reactor in step (e) is composed of inert solid particles and/or pellets formed from the decomposition reaction.

* * * * *